United States Patent

Tanaka et al.

[11] Patent Number: 5,953,163
[45] Date of Patent: Sep. 14, 1999

[54] WATERPROOF LENS BARREL

[75] Inventors: Hitoshi Tanaka, Saitama; Kosei Kosako, Tokyo, both of Japan

[73] Assignee: Asahi Kogaku Kogyo Kabushiki Kaisha, Tokyo, Japan

[21] Appl. No.: 09/223,564

[22] Filed: Dec. 31, 1998

[30] Foreign Application Priority Data

Jan. 9, 1998 [JP] Japan .................................. 10-002960

[51] Int. Cl.[6] .............................. G02B 15/14; G03B 17/08
[52] U.S. Cl. .............................................. 359/704; 396/25
[58] Field of Search .................................... 359/694, 704, 359/819, 823; 396/25, 26, 27, 28, 29

[56] References Cited

U.S. PATENT DOCUMENTS

| 5,066,965 | 11/1991 | Tanaka et al. | 396/29 |
| 5,070,348 | 12/1991 | Hayakawa et al. | 396/26 |
| 5,305,145 | 4/1994 | Tanaka | 359/513 |
| 5,335,028 | 8/1994 | Kosako | 396/29 |
| 5,701,518 | 12/1997 | Honda et al. | 396/29 |

FOREIGN PATENT DOCUMENTS 5-15032  2/1993  Japan .

*Primary Examiner*—Georgia Epps
*Assistant Examiner*—Ricky Mack
*Attorney, Agent, or Firm*—Greenblum & Bernstein, P.L.C.

[57] ABSTRACT

In a waterproof lens barrel in which a water-tight movable barrel which moves in the optical a is direction includes inner and outer cylinders, and a space between the inner and outer cylinders is sealed by an annular seal member, the annular seal member is held by a seal member holding ring separate from the inner cylinder or the outer cylinder. The seal member holding ring is inserted in the outer cylinder, wherein the annular seal member is brought into elastic contact with the inner surface of the outer cylinder. The inner cylinder is fitted in and secured to the outer cylinder, wherein the seal member holding ring is located in front of the inner cylinder.

12 Claims, 5 Drawing Sheets

WATERPROOF LENS BARREL

BACKGROUND OF THE INVENTION

1. Field of the Invention

The present invention relates to a waterproof lens barrel, and in particular it relates to a waterproof lens barrel in which a movable lens barrel which is moved in the optical axis direction includes inner and outer cylinders of which a space defined therebetween is sealed by an annular seal member.

2. Description of the Related Art

In a drip-proof/waterproof lens barrel which has been developed by the assignee of the present application, a movable barrel of a water tight structure is composed of inner and outer cylinders; and a space defined between the inner and outer cylinders is sealed by an annular seal member. Since the outer cylinder is in contact with the seal member, it is preferable that the outer cylinder be a metal pressing, formed from a metal such as an aluminum alloy, to provide increased surface precision and surface hardness. The inner cylinder is preferably made of a synthetic resin mold which can be easily formed to a desired shape. In the simplest seal structure, the annular seal member is held by one of the inner and outer cylinders. However, there is a limitation to the size of the inner and outer cylinders, and hence it is difficult to provide a holding portion to hold the annular seal member (e.g., an O-ring) on the inner cylinder or the outer cylinder. If the annular seal member is held on the outer periphery of the inner cylinder which is fitted inside the outer cylinder, since the insertion resistance increases as the axial fitting length of the inner and outer cylinders increases, it takes a long time to fit the inner cylinder in the outer cylinder, with the annular seal member being incorporated therebetween, and the seal member can be twisted or damaged.

SUMMARY OF THE INVENTION

It is an object of the present invention to provide a waterproof lens barrel in which the movable lens barrel of a water tight structure is composed of inner and outer cylinders and the gap therebetween is sealed, and wherein the inner and outer cylinders can be made thin and can be easily formed into a desired shape.

Another object of the present invention is to provide a waterproof lens barrel in which an annular seal member can be easily incorporated without being twisted or damaged.

According to the present invention, there is provided a waterproof lens barrel in which a waterproof lens barrel including a water-tight movable barrel which moves in the optical axis direction and which includes inner and outer cylinders, wherein a space between the inner and outer cylinders is sealed by an annular seal member; wherein: the annular seal member is held by a seal member holding ring separate from the inner cylinder and the outer cylinder; the seal member holding ring which holds the annular seal member is inserted into the outer cylinder, wherein the annular seal member is brought into elastic contact with the inner surface of the outer cylinder; and the inner cylinder is fitted in and secured to the outer cylinder, wherein the seal member holding ring is located in front of the inner cylinder.

Preferably, the inner diameter of the outer cylinder and the largest diameter of the seal member holding ring are determined whereby the seal member holding ring inserted in the outer cylinder with the center axis of the seal member holding ring is perpendicular to the center axis of the outer cylinder can be rotated to make the center axis of the seal member holding ring coincident with the center axis of the outer cylinder.

Preferably, the seal member holding ring is held between an inner flange formed at the front end of the outer cylinder and the front end of the inner cylinder.

Preferably, the outer cylinder is made of a thin cylinder whose outer peripheral surface is in contact with another seal member and the inner cylinder is made of a thicker cylinder which is biased to move in the optical axis direction.

Preferably, the seal member holding ring is provided with a glass retaining ring which is connected to the seal member holding ring via a bayonet connection and a transparent sealing glass which is held by the glass retaining ring in a water-tight fashion to seal the opening of the seal member holding ring.

Preferably, the waterproof lens barrel further includes engagement portions which are provided between the inner cylinder or an element integral therewith and the seal member holding ring and which engage with each other to prevent the relative rotation therebetween.

Preferably, the outer cylinder is made of a metal and the inner cylinder is made of a synthetic resin mold.

According to another aspect of the present invention, there is provided a waterproof lens barrel including: a water-tight movable barrel that moves in the optical axis direction, the water-tight movable barrel including inner and outer cylinders; an annular seal member that seals a space between the inner and outer cylinders; a seal member holding ring that holds said annular seal member, the seal member holding ring being separate from the inner cylinder and the outer cylinders wherein the annular seal member held by the seal member holding ring is brought into elastic contact with the inner surface of the outer cylinder, and an inner flange that is formed at the front end of the outer cylinder, the seal member holding ring being held between said inner flange and the front end of the inner cylinder.

Preferably, the inner diameter of the outer cylinder and the largest diameter of the seal member holding ring are determined whereby the seal member holding ring inserted in the outer cylinder with the center axis of the seal member holding ring being perpendicular to the center axis of the outer cylinder can be rotated to make the center axis of the seal member holding ring coincident with the center axis of the outer cylinder.

According to another aspect of the present invention, there is provided a waterproof lens barrel including: a water-tight movable barrel that moves in the optical axis direction, said water-tight movable barrel including inner and outer cylinders; a first annular seal member that seals a space between said inner and outer cylinders; a seal member holding ring that holds the first annular seal member, the seal member holding ring being separate from the inner cylinder and the outer cylinders wherein the first annular seal member held by the seal member holding ring is brought into elastic contact with the inner surface of the outer cylinder; a glass retaining ring which is connected to the seal member holding ring via a bayonet connection and a transparent sealing glass which is held by the glass retaining ring in a water-tight fashion to seal the opening of the seal member holding ring; and a second annular seal member that seals a space between the inner cylinder and the transparent sealing glass, wherein the seal member holding ring holds the second annular seal member.

Preferably, the second annular seal member held by the seal member holding ring is brought into elastic contact with the rear surface of the glass retaining ring.

Preferably, an inner flange that is formed at the front end of the outer cylinder, the seal member holding ring being held between the inner flange and the front end of said inner cylinder.

The present disclosure relates to subject matter contained in Japanese Patent Application No.10-2960 (filed on Jan. 9, 1998) which is expressly incorporated herein by reference in its entirety.

BRIEF DESCRIPTION OF THE DRAWINGS

The invention will be discussed below in detail with reference to the accompanying drawings in which.

DESCRIPTION OF THE PREFERRED EMBODIMENT

Figure 1:
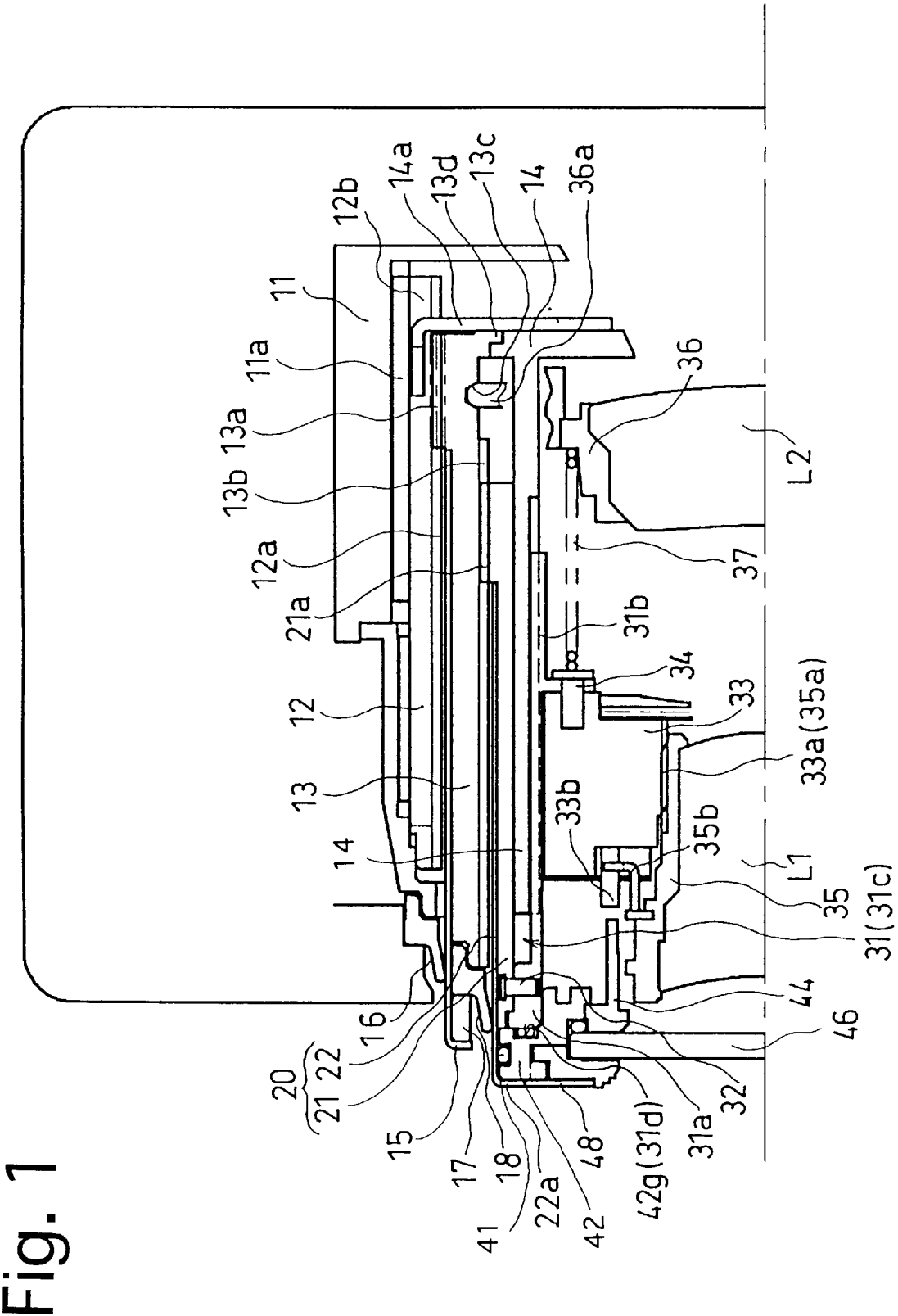
FIG. 1 is sectional view of a waterproof lens barrel, taken along the line I—I in FIG. 3, according to the present invention.
Figure 2:
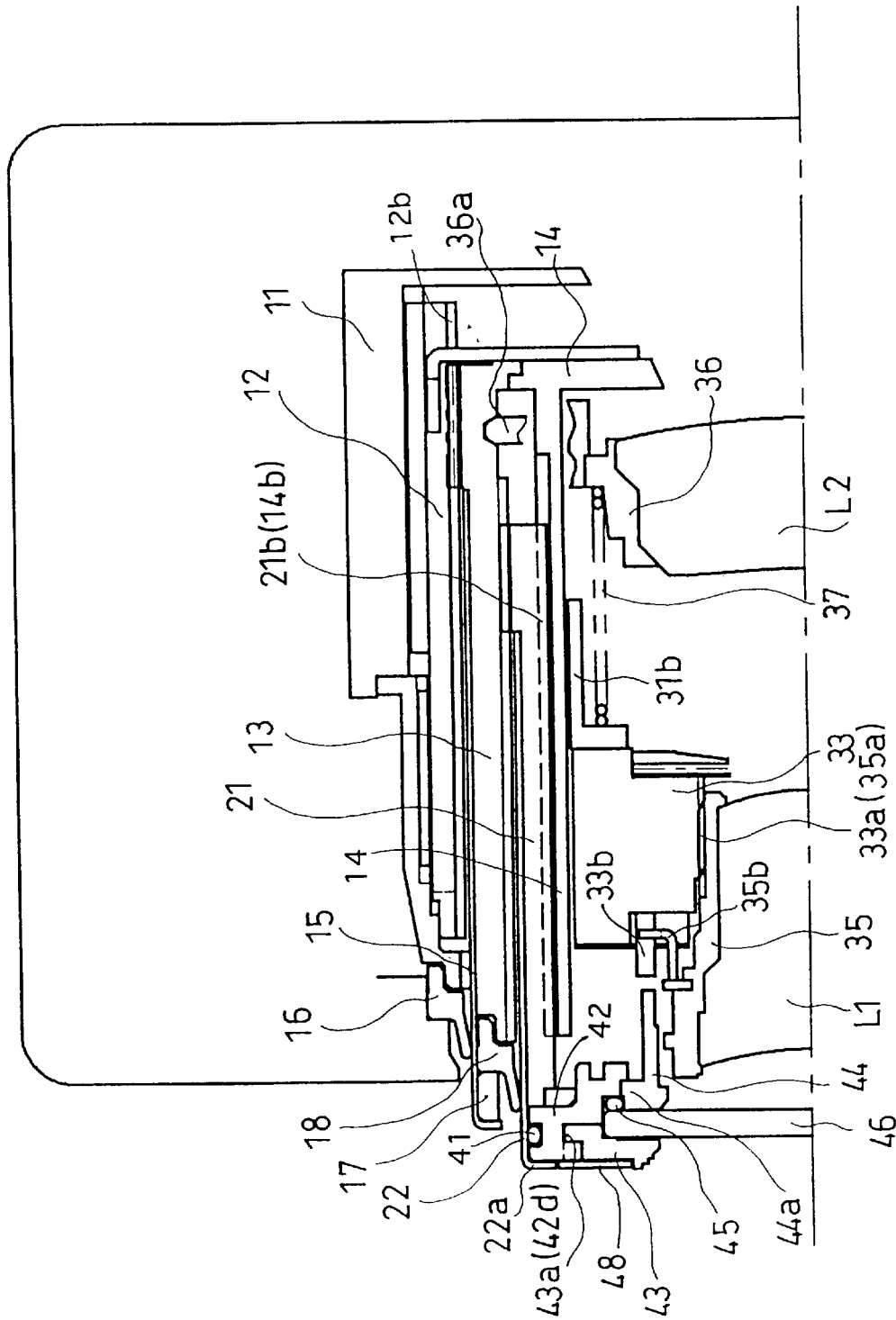
FIG. 2 is a sectional view taken along the line II—II in FIG. 3.
Figure 3:
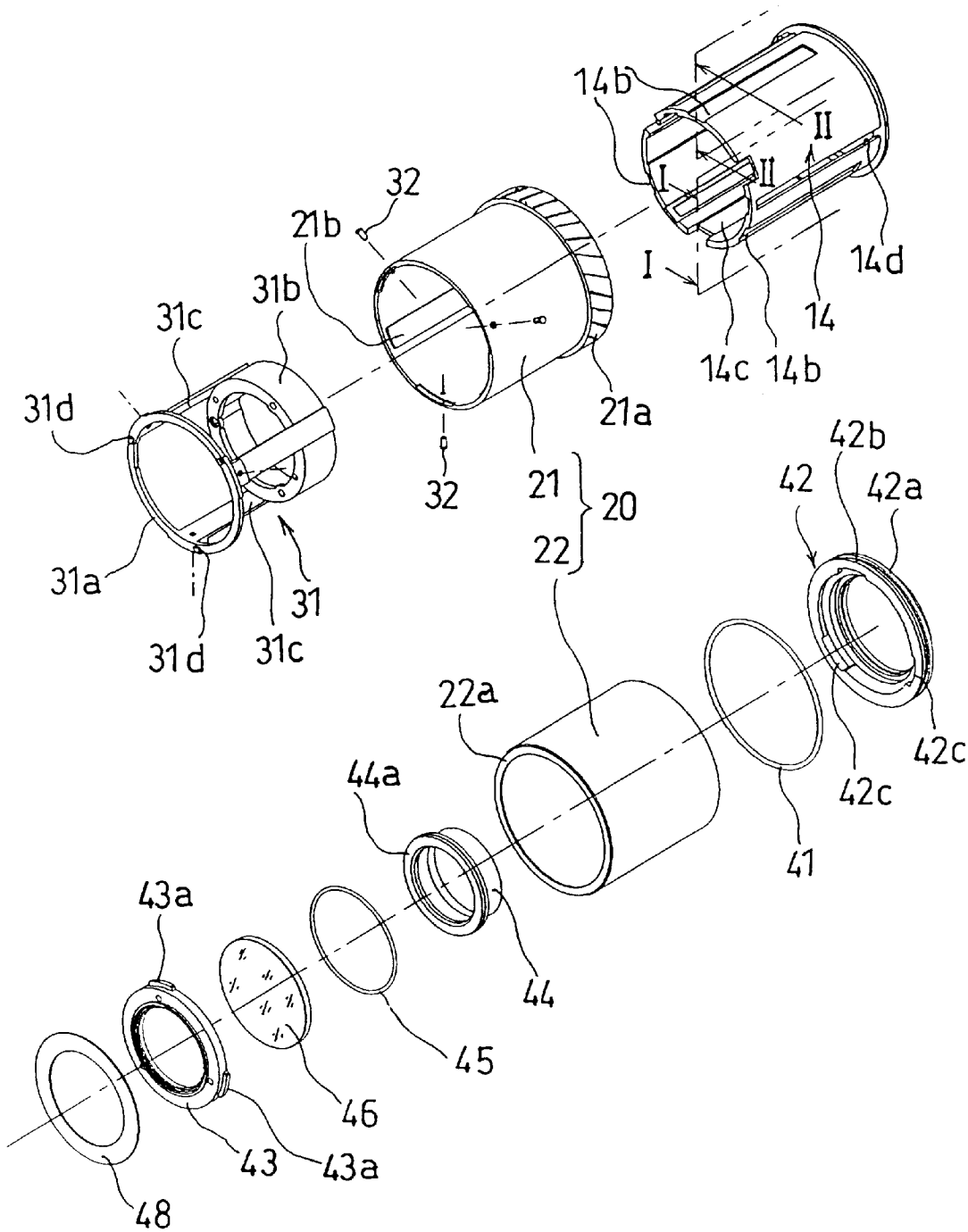
FIG. 3 is an exploded perspective view of a waterproof lens barrel according to the present invention.

FIGS. 1 through 3 show an internal structure of a waterproof lens barrel according to the present invention. A housing 11 secured to a camera body is provided with a stationary frame 12. The stationary frame 12 is movable in the optical a is direction along a linear movement guide portion 11a of the housing 11 to adjust the back focal distance upon assembly, but is secured to the housing 11 after the adjustment of the back focal distance is completed. The stationary frame 12 is provided on its inner peripheral surface with a female helicoid 12a and a linear movement guide groove 12b extending in the optical axis direction.

A cam ring 13 is fitted into the stationary frame 12. The cam ring 13 is provided on its outer peripheral surface with a male helicoid 13a which is in mesh with the female helicoid 12a of the stationary frame 12 and on its inner peripheral surface with a female helicoid 13b and a rear lens cam groove 13c for a rear lens group. The cam ring 13 is connected to a linear movement guide ring 14 which is guided in the linear movement guide groove 12b of the stationary frame 12 so as to linearly move, wherein the cam ring 13 can rotate but cannot move in the optical axis direction, relative to the linear movement guide ring 14. Namely, a linear movement guide key 14a secured to the rear end of the linear movement guide ring 14 is fitted in the linear movement guide groove 12b of the stationary frame 12, and an inner flange 13d formed at the rear end of the cam ring 13 is rotatably held between the linear movement guide ring 14 and the linear movement guide key 14a so as not to relatively move.

A movable barrel 20 of a double-tube structure is provided between the cam ring 13 and the linear movement guide ring 14. The movable barrel 20 includes an inner cylinder 21 which is provided on its rear end with a male helicoid 21a which is in mesh with the female helicoid 13b of the cam ring 13 and an outer cylinder 22 in which the inner cylinder 21 is snugly fitted. The outer cylinder 22 is provided on its front end with a flange 22a which projects inwardly, integral therewith. The inner cylinder 21 is made of a synthetic resin mold, and the outer cylinder 22 which is thinner than the inner cylinder 21 is formed by a metal pressing (drawing); for example, an aluminum alloy.

The linear movement guide ring 14 is provided on the outer peripheral surface thereof with a linear movement guide groove 14b which extends in parallel with the optical axis. The inner cylinder 21 is provided on the inner peripheral surface thereof with a linear movement guide projection 21b which extends in parallel with the optical axis and which is fitted in the linear movement guide groove 14b, thereby the rotation of the inner cylinder 21 relative to the linear movement guide ring 14 is prevented. Consequently, the inner cylinder 21 (movable barrel 20) whose rotation is prevented is linearly moved in the optical axis direction through the engagement of the female helicoid 13b and the male helicoid 21a when the cam ring 13 is rotated by a drive mechanism (not shown). During the rotation of the cam ring 13, the same is linearly moved in the optical a is direction through the engagement of the male helicoid 13a and the female helicoid 12a. Consequently, the linear movement guide ring 14, whose rotation is prevented by the linear movement guide groove 12b, is moved linearly without rotating, in association with the linear movement of the cam ring 13.

The cam ring 13 is equipped with a decoration cylinder 15 secured to the outer peripheral surface thereof. A first annular seal packing 16 secured to the camera body is elastically pressed against the outer peripheral surface of the decoration cylinder 15. A second annular seal packing 18 is secured to the inner peripheral surface of the decoration cylinder 15 at the front end thereof through an annular spacer 17, wherein the seal packing 18 is in elastic contact with the outer peripheral surface of the outer cylinder 22. The decoration cylinder 15 is made of a metal which can be precisely machined or shaped and provides a high surface hardness.

When the rotation of the cam ring 13 occurs, the decoration cylinder 15 integral with the cam ring 13 is rotated and moved in the optical axis direction while being in contact with the seal packing 16; and the outer cylinder 22 (movable barrel 20) is moved relative to the decoration cylinder 15 in the optical axis direction while being in contact with the seal packing 18 on the inner peripheral surface of the front end of the decoration cylinder 15 (cam ring 13). In the water tight structure on the outer diameter side of the movable barrel 20 as constructed above, since the outer cylinder 22 and the decoration cylinder 15 are both made of metals which can be precisely machined or shaped and have high surface hardness, good drip-proof and waterproof properties can be easily attained.

The structure on the inner diameter side of the movable barrel 20 will be discussed below. A shutter mounting ring 31 is inserted in and secured to the inner cylinder 21 by means of mounting pins 32 (FIG. 3). As shown in FIG. 3, the shutter mounting ring 31 is composed of a front annular portion 31a and a rear annular cylindrical portion 31b which are connected therebetween by connection bars 31c provided at the peripheral edges thereof. The linear movement guide ring 14 is provided with fitting grooves 14c in which the connection bars 31c are fitted.

A shutter unit 33 is secured to the rear cylindrical portion 31b of the shutter mounting ring 31 by means of mounting pins 34 (FIG. 1). As is well known, a male helicoid 35a of a front lens frame 35 to which a front lens group L1 is secured is screw-engaged with a female helicoid 33a provided at a center portion of the shutter unit 33, and a drive pin 33b eccentric from the optical axis engages with an association lever 35b integrally formed with the front lens frame 35. Upon shutter releasing, the drive pin 33b is rotated by an angle corresponding to object distance data, so that the front lens frame 35 (front lens group L1) is moved in the optical axis direction in accordance with the male helicoid 35a and the female helicoid 33a.

A rear lens frame 36 which holds a rear lens group L2 is provided with a radially projecting cam follower pin 36a integral therewith, which extends through an axially e tending linear movement guide groove 14d formed in the linear movement guide ring 14 and is fitted in a rear lens cam groove 13c of the cam ring 13. A backlash removing compression coil spring 37 is provided between the shutter mounting ring 31 and the rear lens frame 36 to rearwardly bias the rear lens frame 36 (rear lens group L2) with respect to the shutter mounting ring 31 (front lens group L1).

The shutter mounting ring 31 (the shutter unit 33 which holds the front lens group L1) is secured to the inner cylinder 21 (movable barrel 20), so that when the cam ring 13 rotates, the shutter mounting ring 31 is moved in the optical axis direction due to the engagement of the male helicoid 21a and the female helicoid 13b. At the same time, the rear lens frame 36 (rear lens group L2) is moved in accordance with the rear lens cam groove 13c to vary the spatial distance between the rear lens frame 36 (rear lens group L2) and the shutter mounting ring 31 (front lens group L1) to thereby vary the focal length.

Figure 5:
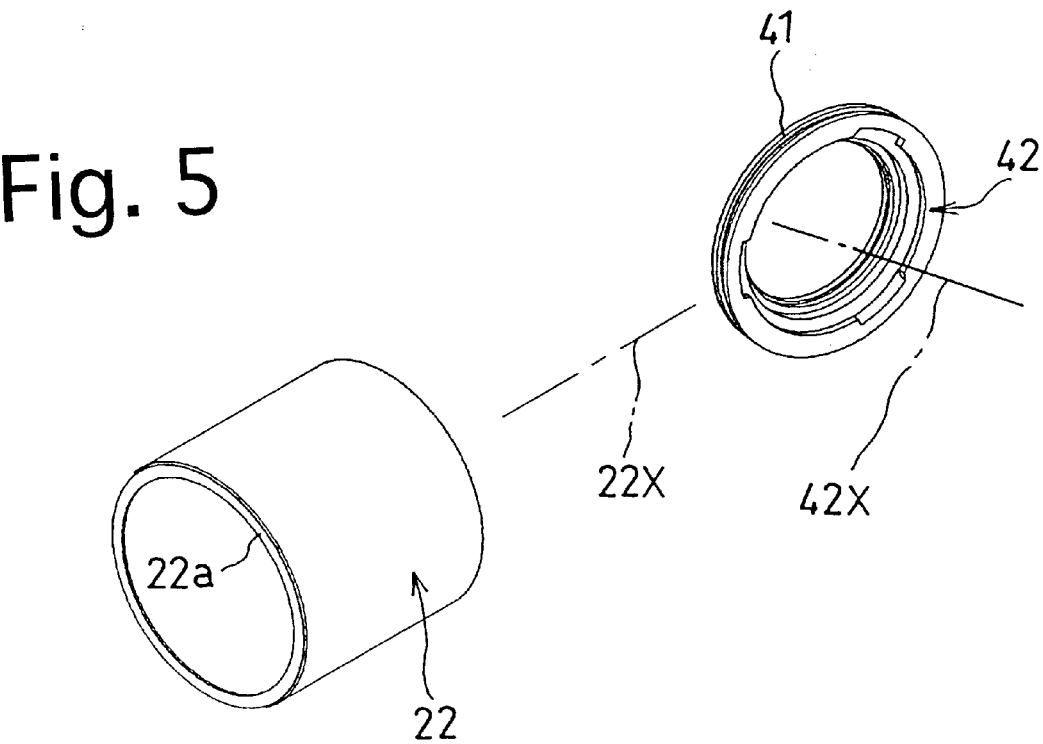
FIG. 5 is a perspective view of an outer cylinder and a seal member holding ring to explain another insertion operation; and, FIG. 6 is a sectional view of FIG. 5 along a plane perpendicular to the optical axis (center axis of the outer cylinder) when the seal member holding ring is inserted in the outer cylinder.
Figure 6:
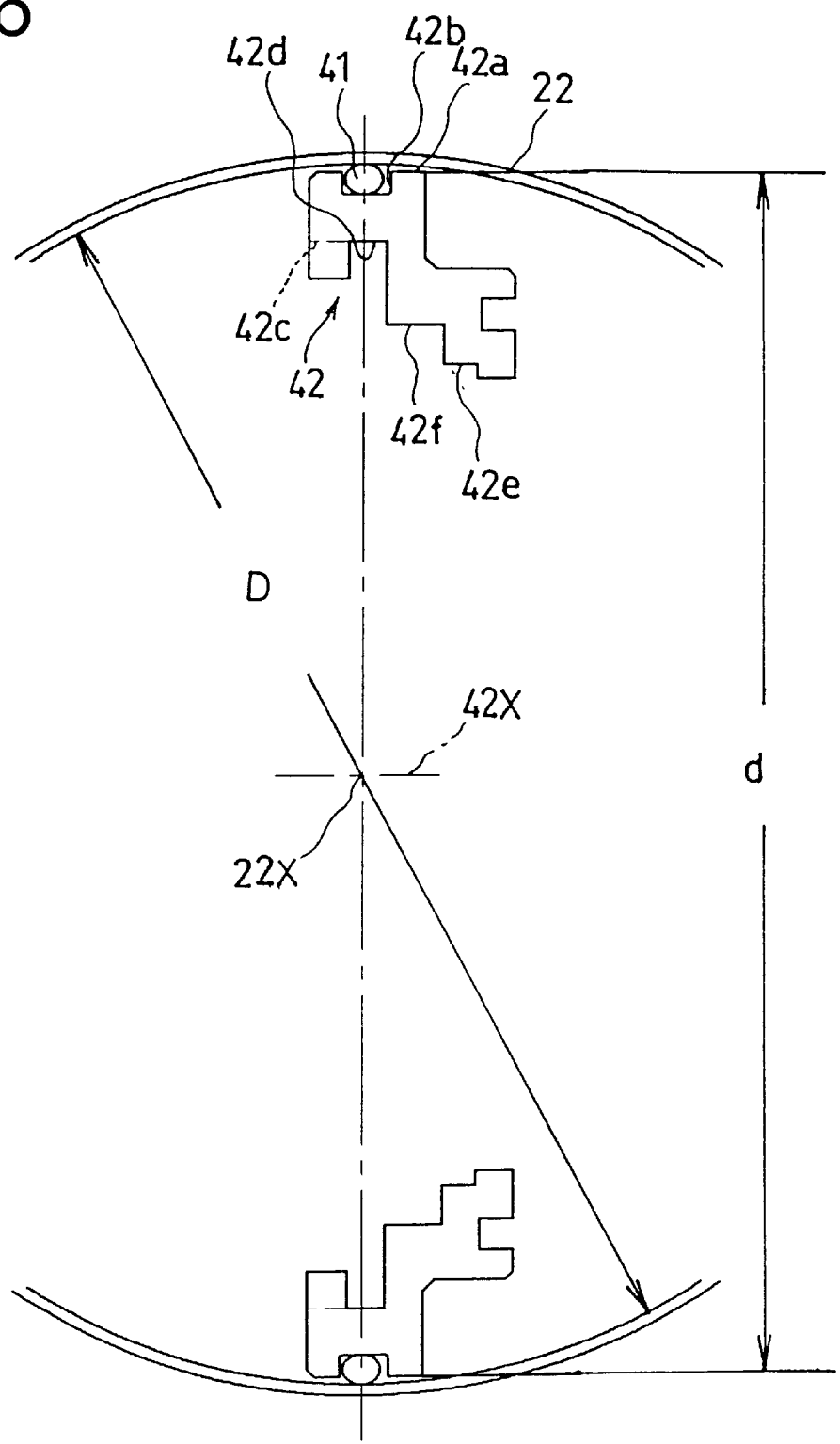

An O-ring (annular seal member) 41 which seals an annular space between the inner and outer cylinders 21 and 22 is held by a seal member holding ring 42. As clearly shown in FIG. 6, the seal member holding ring 42 is provided, on the center portion of the largest diameter portion 42a thereof, with an annular groove 42b in which the O-ring 41 is fitted. The largest diameter dφ of the largest diameter portion 42a of the holding ring 42 and the inner diameter Dφ of the outer cylinder 22 are determined so that the holding ring 42 can be rotated within the outer cylinder 22. Namely, as can be seen in FIGS. 5 and 6, the holding ring 42 is inserted in the outer cylinder 22 at a position in which the center axis 42X of the holding ring 42 is perpendicular to the center axis 22X (optical axis) of the outer cylinder 22; and thereafter, the holding ring 42 is rotated whereby the center axis 42X becomes identical to the center axis 22X.

The holding ring 42 is provided on the front end face thereof with insertion grooves 42c which receive therein a plurality of circumferential projections 43a of a glass retaining ring 43. The insertion grooves 42c are connected to an annular bayonet groove 42d. The bayonet groove 42d is shaped so that when the circumferential projections 43a of the glass retaining ring 43 inserted in the insertion grooves 42c are rotated, the glass retaining ring 43 is firmly connected to the holding ring 42 in a bayonet coupling fashion. Moreover, the holding ring 42 is provided with a stepped engagement portion 42e for a light interception cylinder 44, and a stepped engagement portion 42f for the O-ring (annular seal member) 45 and a transparent sealing glass 46, in this order from the inner diameter side.

The front annular portion 31a of the shutter mounting ring 31 is equipped with a plurality of engagement projections 31d which are adapted to prevent the rotation of the seal member holding ring 42 upon assembly. The seal member holding ring 42 is provided with engagement holes 42g (FIG. 1) in which the engagement projections 31d are fitted.

Figure 4:
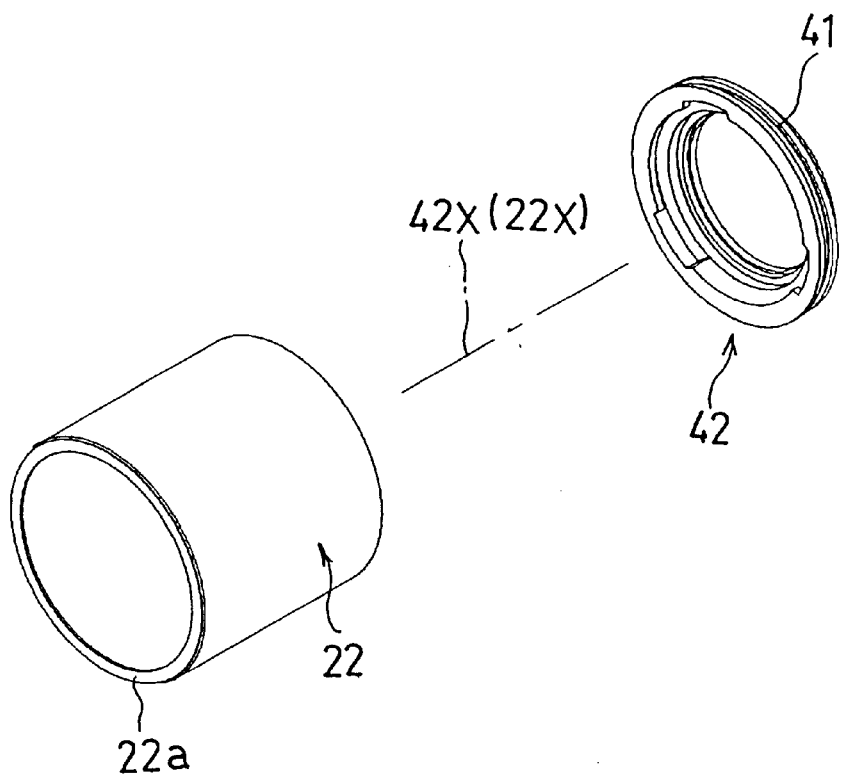
FIG. 4 is a perspective view of an outer cylinder and a seal member holding ring having an O-ring attached thereto to explain an insertion operation.

Upon assembling the movable barrel 20 and the components associated therewith, the O-ring 41 is fitted in the annular groove 42b of the seal member holding ring 42 in advance, and the seal member holding ring 42 is inserted into the outer cylinder 22. The insertion can be carried out when the center axis 42X is identical to the center axis 22X as shown in FIG. 4, or the center axis 42X is perpendicular to the center axis 22X as shown in FIG. 5. In FIG. 4 in which the entire periphery of the O-ring 41 is always in sliding contact with the inner peripheral surface of the outer cylinder 22 during the insertion procedure; hence the insertion resistance is relatively large. In FIG. 5, the O-ring 41 is in sliding contact with the inner peripheral surface of the outer cylinder 22 only at the opposite ends of the O-ring 41 in the radial direction, and hence the insertion resistance is relatively small. In FIG. 5, the holding ring 42 is inserted into the outer cylinder 22 until the holding ring 42 comes into contact with the inner flange 22a and thereafter, the holding ring 42 and the outer cylinder 22 are relatively rotated so that the center axis 42X becomes identical to the center axis 22X. Thereafter, the holding ring 42 is moved in the axial direction in the outer cylinder 22 until the ring 42 comes into contact with the inner flange 22a of the outer cylinder 22.

The outer cylinder 22 in which the holding ring 42 (O-ring 41) has been inserted is fitted onto the inner cylinder 21 which has been assembled together with the associated elements. At the same time, the engagement projections 31d of the shutter mounting ring 31 are fitted in the engagement holes 42g of the holding ring 42. The outer cylinder 22 is then secured to the inner cylinder 21 by means of an adhesive or screws while holding the holding ring 42 between the front end of the inner cylinder 21 and the inner flange 22a of the outer cylinder 22. In this state, the inner cylinder 21, the seal member holding ring 42, and the inner flange 22a at the front end of the outer cylinder 22 are located in this order from the camera body side. The inner cylinder 21 is assembled in advance together with the associated elements, including the shutter mounting ring 31, the shutter unit 33, the front lens frame 35, the linear movement guide ring 14, and the cam ring 13, etc; wherein the rotation thereof is prevented. The rotation of the seal member holding ring 42 is also prevented by the engagement of the engagement holes 42g thereof and the engagement projections 31d of the shutter mounting ring 31.

The outer flange 44a of the light interception cylinder 44 is engaged in the stepped engagement portion 42e of the seal member holding ring 42 which is held between the inner cylinder 21 and the outer cylinder 22, and the O-ring 45 and the transparent sealing glass 46 are fitted in the stepped engagement portion 42f. Thereafter, the circumferential projections 43a of the glass retaining ring 43 are fitted in the insertion grooves 42c and are rotated in the bayonet annular groove 42d. Consequently, the glass retaining ring 43 is firmly connected to the holding ring 42 in the bayonet fashion, wherein the O-ring 45 is compressed; thereby completing the waterproof structure of the opening of the glass retaining ring 43 (of the movable barrel 20). Thereafter, the annular decoration plate 48 is attached to the front face of the glass retaining ring 43 to cover the insertion grooves 42c. Namely, the gap between the inner cylinder 21 and the outer cylinder 22 is sealed by the O-ring 41 held by the seal member holding ring 42. The front opening of the holding ring 42 (of the movable cylinder 20) is sealed by the O-ring 45 and the transparent sealing glass 46.

The largest diameter of the seal member holding ring 42 and the inner diameter of the outer cylinder 22 are preferably such that the insertion and rotation shown in both FIG. 5 and FIG. 6 can be carried out. Even if no rotation is possible (i.e., if the insertion shown in FIG. 4 can be only carried out) since the O-ring 41 is held by the seal member holding ring 42 separate from the inner cylinder 21 or the outer cylinder 22, the thickness of the inner and outer cylinders 21 and 22 can be reduced and the freedom of design of the shape of the inner and outer cylinders 21 and 22 can be enhanced.

According to the present invention, in a waterproof lens barrel in which the water-tight movable barrel is composed of inner and outer cylinders and the gap between the inner and outer cylinders is sealed, not only can the inner and outer cylinders be made thin, but also the freedom of design of the shape of the inner and outer cylinders can be increased. Moreover, the annular seal member can be easily incorporated without being twisted or damaged.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A waterproof lens barrel comprising a water-tight movable barrel which moves in the optical axis direction and which is comprised of inner and outer cylinders, wherein a space between the inner and outer cylinders is sealed by an annular seal member, wherein:

said annular seal member is held by a seal member holding ring separate from the inner cylinder and the outer cylinder;

said seal member holding ring which holds the annular seal member is inserted into the outer cylinder, wherein the annular seal member is brought into elastic contact with the inner surface of the outer cylinder;

said inner cylinder being fitted in and secured to the outer cylinder, wherein the seal member holding ring is located in front of the inner cylinder.

2. A waterproof lens barrel according to claim 1, wherein the inner diameter of the outer cylinder and the largest diameter of the seal member holding ring are determined whereby the seal member holding ring inserted in the outer cylinder with the center axis of the seal member holding ring is perpendicular to the center axis of the outer cylinder can be rotated to make the center axis of the seal member holding ring coincident with the center axis of the outer cylinder.

3. A waterproof lens barrel according to claim 1, wherein the seal member holding ring is held between an inner flange formed at the front end of the outer cylinder and the front end of the inner cylinder.

4. A waterproof lens barrel according to claim 1, wherein the outer cylinder is made of a thin cylinder whose outer peripheral surface is in contact with another seal member and the inner cylinder is made of a thicker cylinder which is biased to move in the optical axis direction.

5. A waterproof lens barrel according to claim 1, wherein the seal member holding ring is provided with a glass retaining ring which is connected to the seal member holding ring via a bayonet connection and a transparent sealing glass which is held by the glass retaining ring in a water-tight fashion to seal the opening of the seal member holding ring.

6. A waterproof lens barrel according to claim 1, further comprising engagement portions which are provided between the inner cylinder or an element integral therewith and the seal member holding ring and which engage with each other to prevent the relative rotation therebetween.

7. A waterproof lens barrel according to claim 1, wherein the outer cylinder is made of a metal and the inner cylinder is made of a synthetic resin mold.

8. A waterproof lens barrel comprising:

a water-tight movable barrel that moves in the optical axis direction, said water-tight movable barrel comprising inner and outer cylinders;

an annular seal member that seals a space between the inner and outer cylinders;

a seal member holding ring that holds said annular seal member, said seal member holding ring being separate from the inner cylinder and the outer cylinders wherein said annular seal member held by the seal member holding ring is brought into elastic contact with the inner surface of the outer cylinder, and an inner flange that is formed at the front end of the outer cylinder, said seal member holding ring being held between said inner flange and the front end of the inner cylinder.

9. A waterproof lens barrel according to claim 8, wherein the inner diameter of the outer cylinder and the largest diameter of the seal member holding ring are determined whereby the seal member holding ring inserted in the outer cylinder with the center axis of the seal member holding ring being perpendicular to the center axis of the outer cylinder can be rotated to make the center axis of the seal member holding ring coincident with the center axis of the outer cylinder.

10. A waterproof lens barrel comprising:

a water-tight movable barrel that moves in the optical axis direction, said water-tight movable barrel comprising inner and outer cylinders;

a first annular seal member that seals a space between said inner and outer cylinders;

a seal member holding ring that holds said first annular seal member, said seal member holding ring being separate from said inner cylinder and the outer cylinders wherein said first annular seal member held by said seal member holding ring is brought into elastic contact with the inner surface of said outer cylinder;

a glass retaining ring which is connected to the seal member holding ring via a bayonet connection and a transparent sealing glass which is held by said glass retaining ring in a water-tight fashion to seal the opening of the seal member holding ring; and a second annular seal member that seals a space between said inner cylinder and said transparent sealing glass, wherein said seal member holding ring holds said second annular seal member.

11. A waterproof lens barrel according to claim 10, wherein said second annular seal member held by said seal member holding ring is brought into elastic contact with the rear surface of said glass retaining ring.

12. A waterproof lens barrel according to claim 10, wherein an inner flange that is formed at the front end of said outer cylinder, said seal member holding ring being held between said inner flange and the front end of said inner cylinder.

* * * * *